US006489935B1

(12) United States Patent
Amundsen

(10) Patent No.: US 6,489,935 B1
(45) Date of Patent: Dec. 3, 2002

(54) SYSTEM FOR DISPLAYING INFORMATION ON DISTRIBUTED AUTOMATED TRANSACTION MACHINES

(75) Inventor: Finn Viggo Amundsen, Oslo (NO)

(73) Assignee: Oetr Oekonomisk Transaksjons Reklame AS (NO)

( * ) Notice: Subject to any disclaimer, the term of this patent is extended or adjusted under 35 U.S.C. 154(b) by 0 days.

(21) Appl. No.: 09/463,884

(22) PCT Filed: Jul. 21, 1998

(86) PCT No.: PCT/NO98/00222

§ 371 (c)(1), (2), (4) Date: Jan. 24, 2000

(87) PCT Pub. No.: WO99/08214

PCT Pub. Date: Feb. 18, 1999

(30) Foreign Application Priority Data

Jul. 25, 1997 (NO) ........................................ 973451

(51) Int. Cl.[7] ........................................ G06F 15/16
(52) U.S. Cl. ........................................ 345/2; 709/206
(58) Field of Search ........................ 345/2, 333, 357, 345/329; 395/200; 707/513; 725/112–120; 709/206, 207

(56) References Cited

U.S. PATENT DOCUMENTS

| | | | | |
|---|---|---|---|---|
| 5,305,195 A | | 4/1994 | Murphy | 364/401 |
| 5,379,418 A | | 1/1995 | Shimazaki et al. | 395/575 |
| 5,619,558 A | | 4/1997 | Jhetta | 379/90 |
| 5,642,484 A | | 6/1997 | Harrison et al. | 364/400 |
| 5,761,683 A | * | 6/1998 | Logan et al. | 707/513 |
| 5,809,242 A | * | 9/1998 | Shaw et al. | 395/200 |
| 5,959,623 A | * | 9/1999 | Van Hoff et al. | 345/333 |

FOREIGN PATENT DOCUMENTS

| | | |
|---|---|---|
| EP | 0590837 | 4/1994 |
| EP | 0645744 | 3/1995 |
| EP | 0733983 | 9/1996 |
| WO | WO 9630864 | 10/1996 |

* cited by examiner

*Primary Examiner*—Vijay Shankar
*Assistant Examiner*—Nitin Patel
(74) *Attorney, Agent, or Firm*—Myers Bigel Sibley & Sajovec

(57) ABSTRACT

A system for displaying information on distributed automated transaction devices (2) is described. The information which is to be displayed is stored in a central unit (4), and is transferred to a local unit (1) for display on a screen (11) in an automated transaction device (2) under the control of the local unit (1). Which of a plurality of information messages should be displayed is decided on the basis of a number of criteria determined by the person who wishes to distribute the information message. By means of the system pauses are detected in the automated transaction devices (2), and a message is displayed on the automated transaction device's screen (11) for the duration of the pause. The local unit (1) updates the central unit (4) frequently with regard to the number of exposures, and criteria such as the priority given to the various messages are altered as a result of these updatings. For their part the local units (1) are updated by the central unit (4) when new priorities are calculated, or when new messages or criteria are specified.

14 Claims, 7 Drawing Sheets

Figure 1:
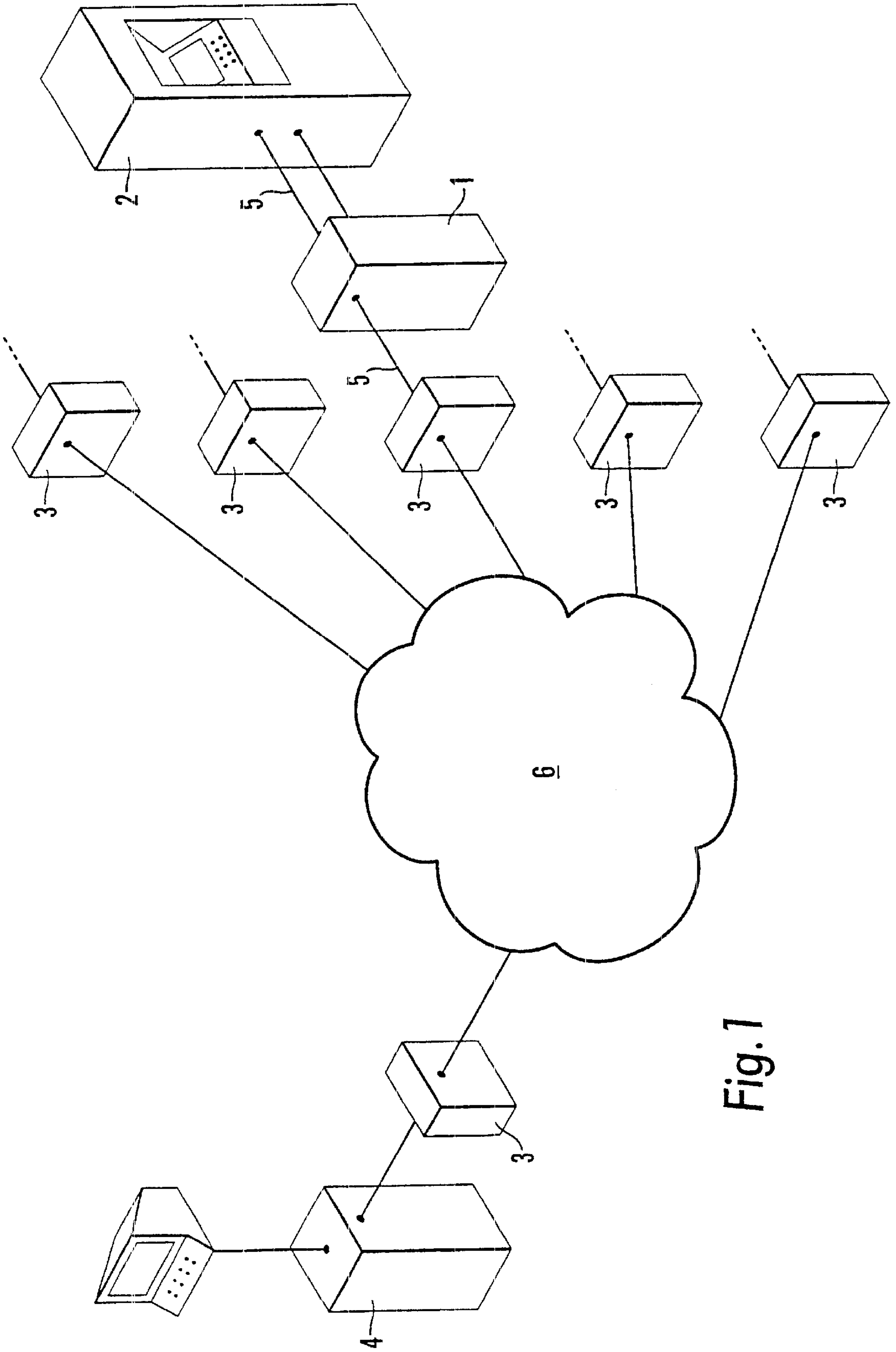

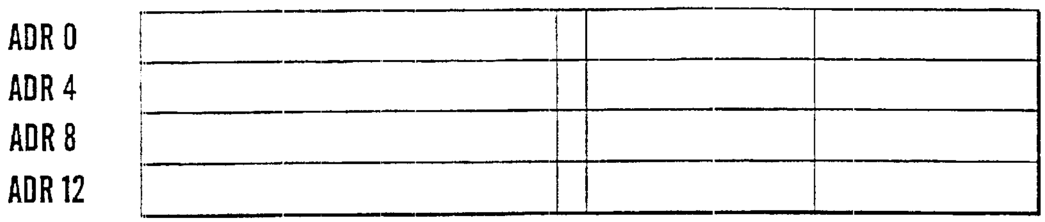
Fig. 9a MEMORY LAYOUT FOR RULES AND SUBRULES
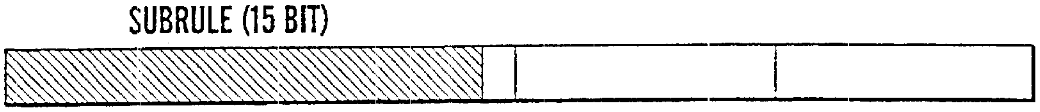
Fig. 9b SUBRULE ADDRESS FIELD
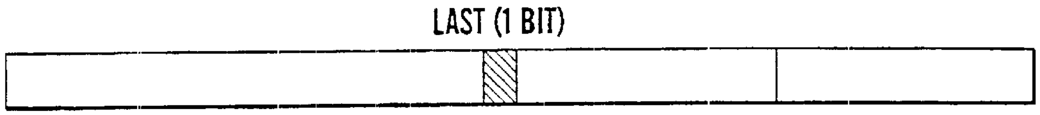
Fig. 9c LAST FIELD
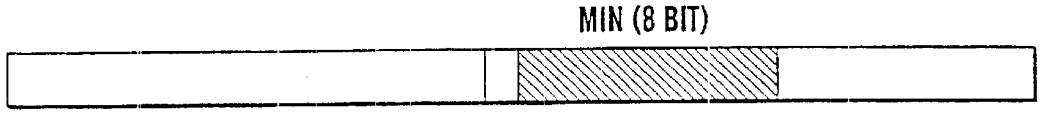
Fig. 9d MIN FIELD
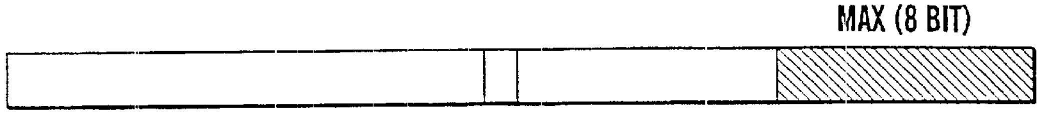
Fig. 9e MAX FIELD
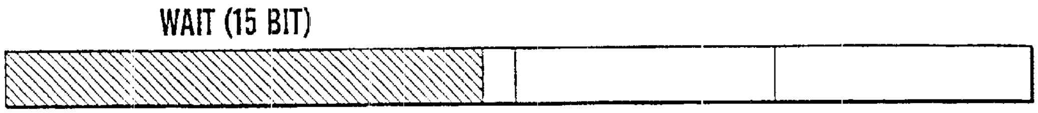
Fig. 9f WAIT FIELD

SYSTEM FOR DISPLAYING INFORMATION ON DISTRIBUTED AUTOMATED TRANSACTION MACHINES

The invention concerns a system for displaying information on distributed automated transaction machines.

The information which is to be displayed is stored in a central unit and is transferred to a local unit for display on a screen in an automated transaction machine under the control of the local unit. Which of a plurality of information messages is to be displayed is decided on the basis of a number of criteria determined by the person who wishes to distribute the information message.

Local data processing stations which comprise a screen for displaying information are already widespread in the form of cash dispensers. Other similar stations also exist, and will become more and more common in the future, for example in the form of automated ordering machines for air tickets, information columns for tourist information, timetables for trains and buses, as well as publicly accessible terminals for connection to the Internet. A common feature of all of these will be that pauses will always arise, for example while a request from the user is being processed, while data are being transferred, while information is printed out, for example in the form of a receipt, etc. During these pauses it is possible to utilize the station's screen for displaying a message. It will also be possible to utilize a part of the screen display to convey the message, for example in the form of a banner running along the top or bottom edge of the screen while the rest of the screen display is employed by the local station.

A number of these data processing stations, hereinafter called automated transaction machines, will often be linked to one another and to one or more central data units via a communication network. This network may be a dedicated data network or telephone network.

It is already known to use the screen on a cash dispenser for presenting information concerning payment cards, loans and other services offered by the owner bank. However, these messages are mainly displayed between transactions, while no user is watching the screen, and the messages cannot be effectively adapted to the automated transaction device's geographical location, time of day and the like. Nor is it possible to keep track in an efficient manner of the number of presentations of a given message for invoicing to a specific customer, viz. the person behind the presentation of the message.

It is therefore an object by means of this system to allow a customer who wishes to have his message exposed to specify under which conditions the information message has to be displayed on the screen of an automated transaction machine. Such conditions may be geographical location of the automated transaction machine, owner of the automated transaction machine, the environment in which the automated transaction machine is located (in a shopping centre, eating-house, petrol station, airport, etc.), time of day, day of the week, etc., type of user access to the automated transaction machine (type of account with which a bank card is associated, form of payment for service, etc.), or what kind of target group the message is intended for (sex, age, etc.). The customer must also be able to specify a lowest and a desired number of exposures per day for a given information message.

It is a further object of the present invention to be able to invoice each exposure of an information message to a specific customer.

Moreover, it is an object to be able to store as comprehensive information as possible concerning the exposures, in order to be able to produce sophisticated invoicing mechanisms, analyses of user groups and user patterns.

It is also an object of the present invention to indicate how the activity in an automated transaction machine can be monitored, thus enabling pauses in a transaction to be detected and the information message displayed in the most effective manner possible.

These and further objects are achieved by means of the features which are stated in the patent claims.

It is not possible in every case to guarantee a desired number of exposures. However, by means of statistical material on the use of the automated transaction machines, it is possible to indicate with a high degree of certainty a probable exposure result. In competition with other media it can be important to safeguard the advantage offered by electronic exposure, viz. the ability to monitor every single exposure. As an example a cash dispenser located in the vicinity of an eating-house may be envisaged. The cash dispenser has on average 100 users per day. The standard deviation, however, is 50, so it is difficult to guarantee a high number of exposures per day. Per week an average of 700 use the cash dispenser, but the standard deviation is still 50, so it is easier to guarantee a certain number of exposures per week. This is natural since the standard deviation normally drops for longer periods of time, but this is not always the case. Since the cash dispenser in the example is located in the vicinity of an eating-house, on Fridays and Saturdays it has on average 200 users, with a standard deviation of 30. Even though this is a shorter period it is possible to guarantee a larger number of exposures than the average number of exposures per day might indicate.

The collection and application of such information is nothing new, but to build database products which support this is complicated. In order to collect the necessary information one generally has to turn to user surveys. In the system according to the invention all such information is available and it is sufficient to process the information in order to be able to use it.

Figure 2:
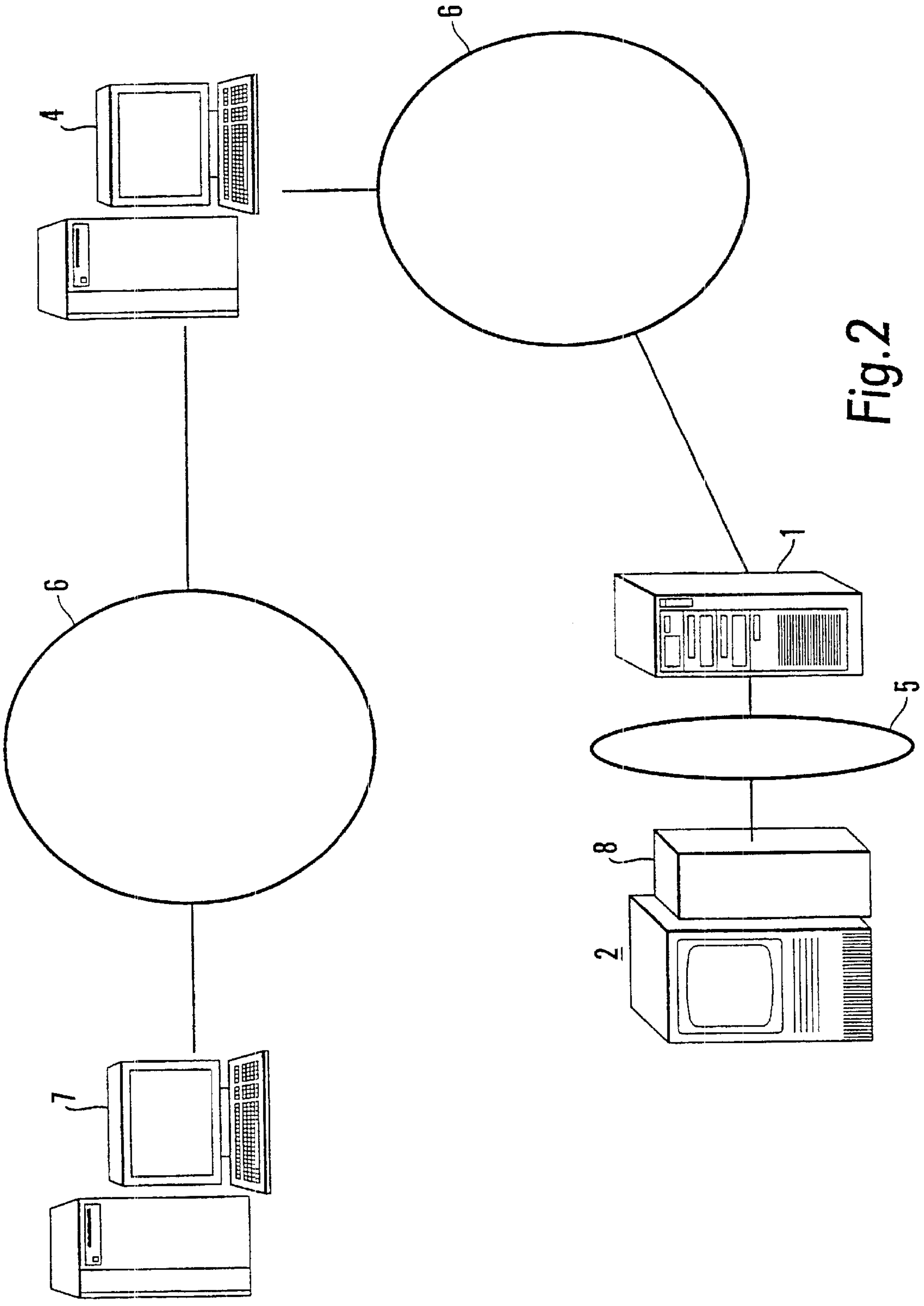
Figure 3:
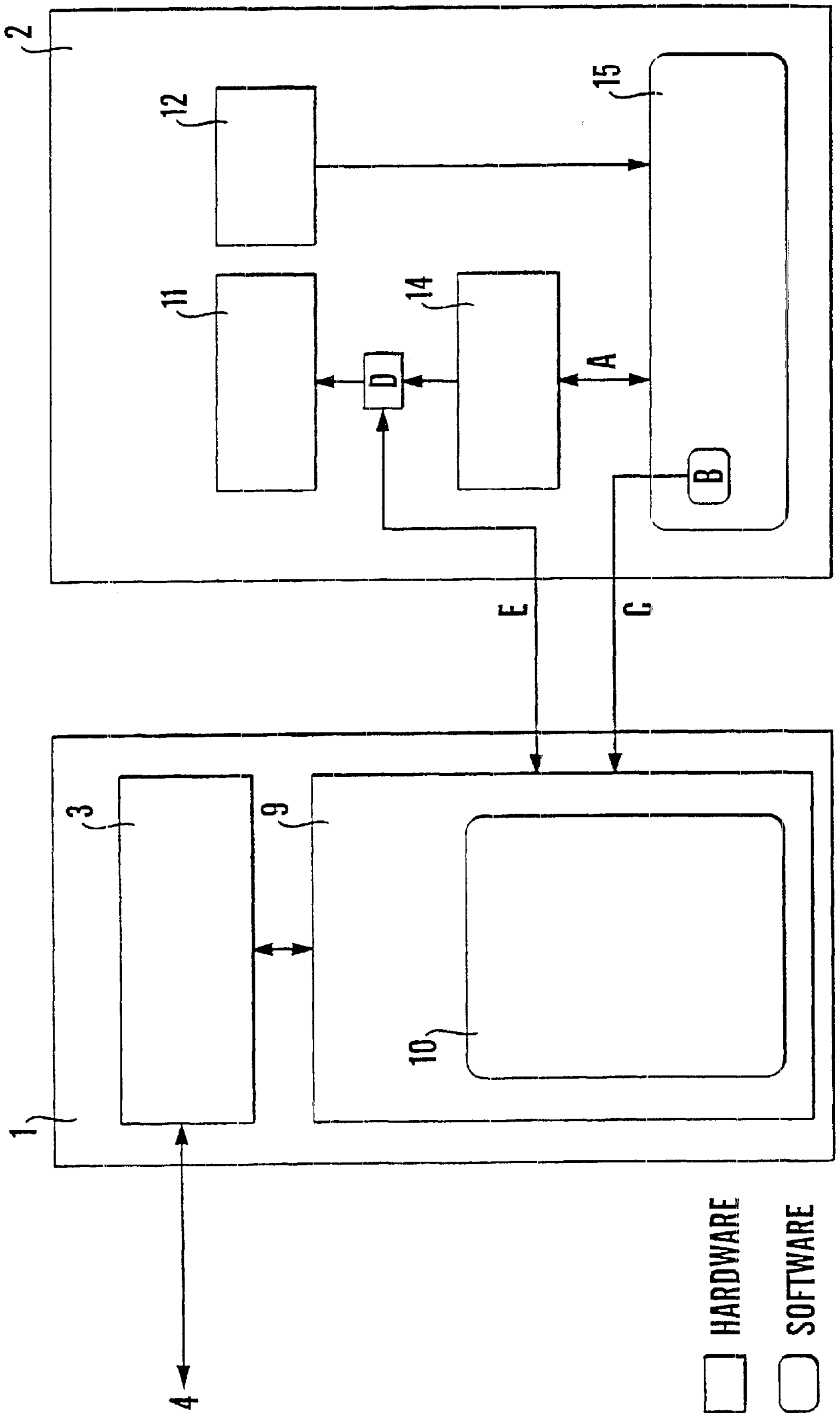
Figure 4:
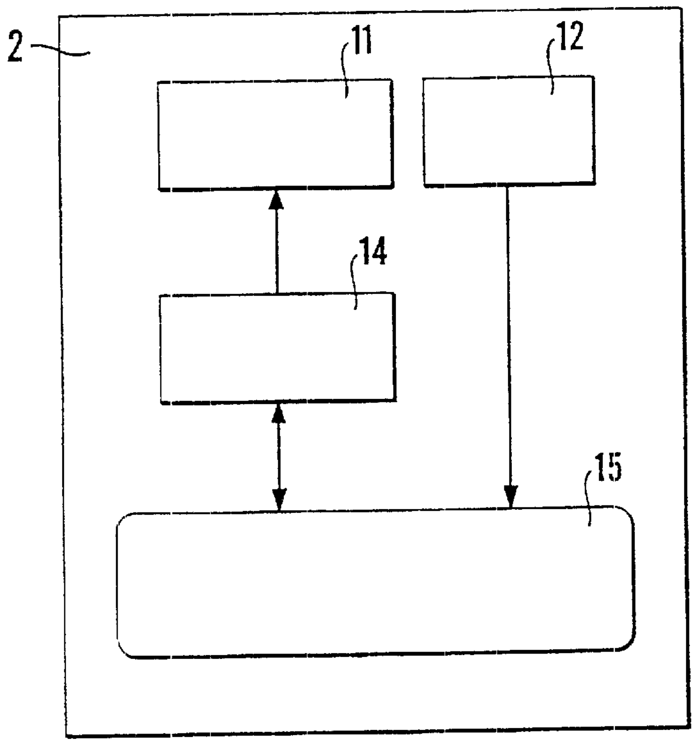
Figure 5:
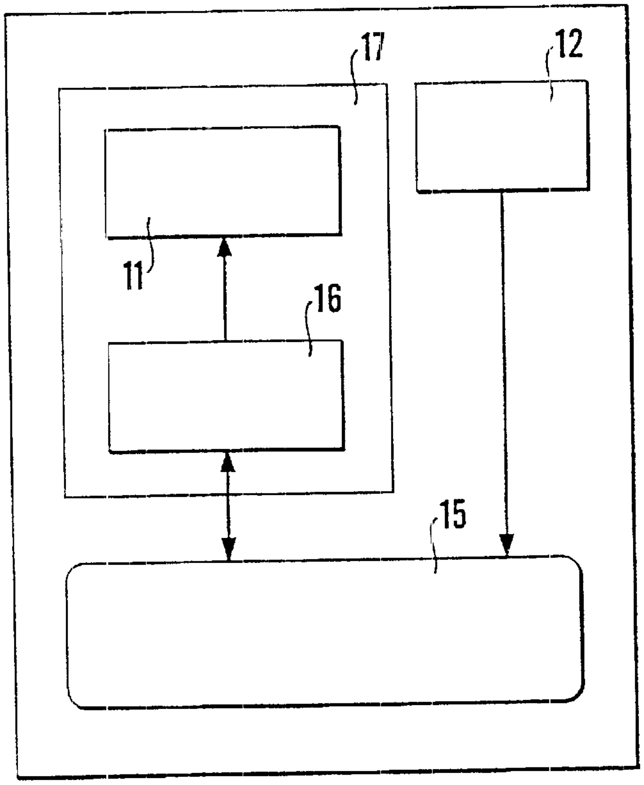
Figure 6:
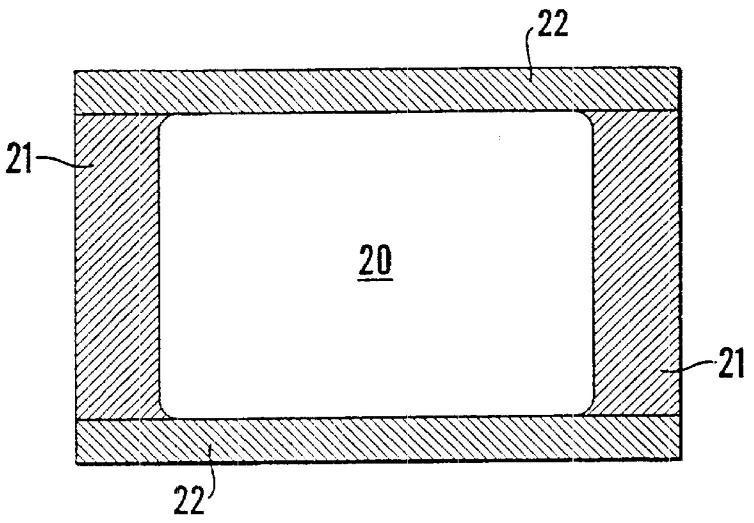
Figure 7:
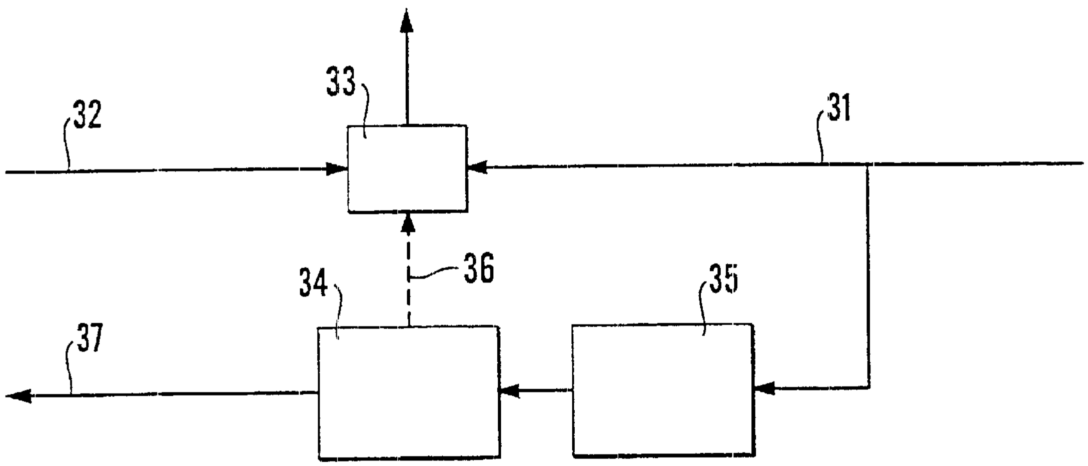
Figure 8:
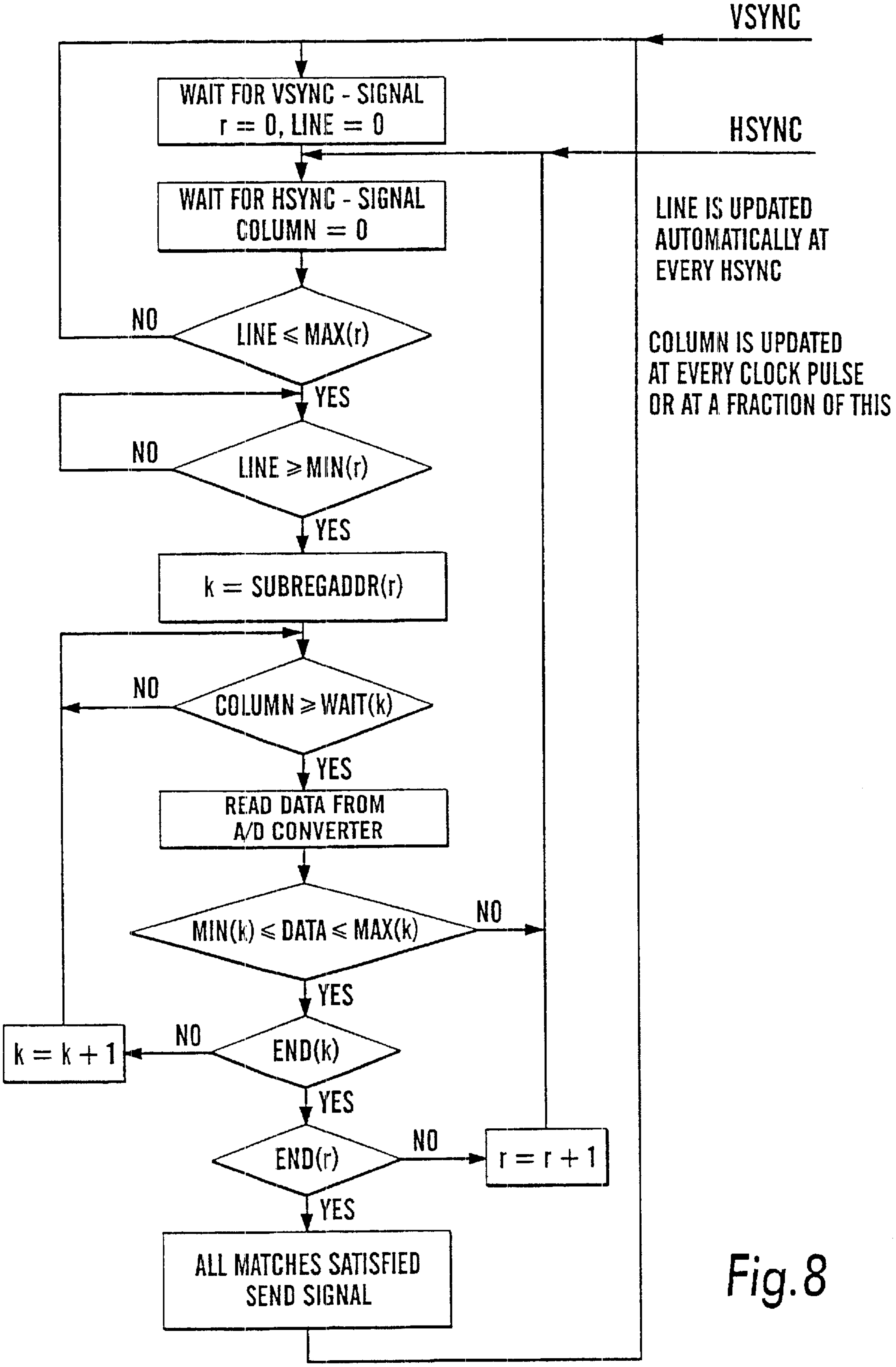

A detailed description will now be given of the invention with reference to the individual figures, in which FIG. 1 is a principle drawing of the invention, FIG. 2 is a principle drawing in which several administrative levels are included, FIG. 3 illustrates the construction of a local unit linked to an automated bank, FIG. 4 is a simplified picture of an automated bank, FIG. 5 illustrates an alternative embodiment of the automated bank in FIG. 4, FIG. 6 illustrates horizontal and vertical overscan in the screen display, FIG. 7 is a schematic illustration of recognition of patterns in analog CRT signals, FIG. 8 is a schematic illustration of an algorithm for recognition of screen signals, FIGS. 9*a–f* illustrate memory layout for rules and subrules.

FIG. 1 illustrates an example of how the communication in the system according to the invention may take place. A local unit 1 is here illustrated connected with an automated transaction machine 2. In this example the central unit 4 and the local units 1 are equipped with a modem 3 or an ISDN link, but they may also be connected by means of other forms of data communication. The communication is performed via a data or telenetwork 6, where one party rings up the other, thus establishing a point-to-point connection. Via this connection a number of different protocols may be run, but one protocol which is to be preferred, is PPP (Point to Point Protocol). PPP offers authentication based on several algorithms, including MD5, which is considered to be difficult to crack. Over this it is possible to run the standard Internet protocol TCP/IP. Over TCP/IP it is possible to place an encrypted communication channel. When connection has been established, the local unit 1 informs the central unit 4 which exposures have occurred since last time, while the central unit updates information on campaigns which are already on the local unit and transfers new campaigns. On the basis of this information the campaign priorities are changed, thus enabling the exposure guarantees to be fulfilled. The priority changes will normally be performed in the central unit 4, and the local unit 1 receives information on how to give priority to the various campaigns. The local unit 1 may receive information concerning the number of exposures at other local units during each communication, and itself change the priority of the various campaigns stored in the unit.

The estimated number of exposures per time unit for a local unit 1 is a function of historical data. Time of day, which day of the week, and possibly also week number concerned will have an effect on the calculations of the central unit. The amount of historical data which is available determines the level of sophistication of the calculation models. If there is little data available, it will often be best to overrule the calculations completely and use artificial data. If there is more data available, a model may be useful where consideration is given to the day of the week and time of the day. If there is a lot of data available week number may be included in the analysis. It may also be relevant to calculate expected number of exposures for an automated transaction machine against a specific target group if this is a part of the exposure guarantee which has to be fulfilled.

During each communication between a local unit 1 and the central unit 4 the istorical database of the central unit will be updated with information on the exposures which have occurred on the local unit since the last communication. The central unit then finds out which campaigns the local unit will be running for the next period. The campaigns have to be loaded over to the local units 1, thus enabling campaigns which are already stored on the local units 1 to be given precedence in order to save metered units. By using historical data the central unit 4 calculates the estimated number of exposures per time unit for the various campaigns. On this basis the central unit 4 then calculates a desired number of exposures within a period of time. If the local unit 1 has too many or too few exposures, it will make contact with the central unit 4 in order to receive updated instructions. The criterion which must be fulfilled in order for this to happen is given by the central unit 4. Such a criterion may, for example, be an upper and a lower limit, as a percentage, of how many extra exposures are permitted in all. In addition there may be an upper and a lower limit per campaign. After expiry of the period of time indicated by the central unit 4, the central unit 4 contacts the local unit 1 and updates it once again.

The central unit 4 has an overview of the priorities of the local units 1 and will be able to contact local units 1 which need to give higher or lower priority to individual campaigns based on the results it receives from other local units.

In association with campaigns information is transferred concerning under which circumstances the campaign should be displayed. We call such a circumstance a trigger. A campaign may have several triggers, and one trigger can activate many campaigns. If several campaigns are activated simultaneously, one of them is selected at random, or they are run sequentially. One trigger may be more specific than another, e.g. a trigger directed at a special customer is more specific than one which is activated in any case. Priority is given to campaigns in such a manner that the most specific triggers are given priority. Some campaigns may also be delayed because they require database inquiry (explained below), in which case other campaigns will be displayed first. Triggers may be linked to the identity of the user of the automated transaction device 2, information about the environment, time of day, etc. The local unit 1 together with the associated automated transaction device(s) 2 therefore have to include the necessary means for retrieving such information. Such information will be referred to as context information.

In order to have the capability of marketing directly to individuals, the campaign concept will be able to cover a number of different presentations. A multi-media presentation cannot function with regard to individuals since a personal message is created dynamically, depending on who the user is. A personal advertisement is, e.g., the text "Ola Nordmann, you have shopped at XYZ centre X times and have won a rose which you can collect at the corner". To be able to write "Ola Nordmann" and find out how many times he has shopped at XYZ centre, the message has to be a program instead of a multi-media presentation. In addition, it must be possible to perform a database inquiry as a part of the generation of the presentation. Campaigns which are transferred therefore include text, image, video, animation or programs, all of which can be coupled to a database inquiry. In order to obtain information on how many times this user has used one of the payment terminals in the shopping centre, the central unit 4 (or another database) must be contacted in order to obtain the information. Campaigns may therefore also contain inquiries in databases which are not contained in the local unit 1. Database inquiry should be able to go anywhere. In many cases it will take so much time to obtain the information via the telephone network that the message will not be completed before the time window available has been used up. In a shopping centre or another relatively limited area, such as, for example, a petrol station, an airport or the like, however, it is possible to connect all the payment terminals 2 in a network 5 with a central database which contains this information. A transaction via a local network is performed quickly. This kind of communication must be encrypted.

The system also offers the possibility of making a message an interactive session. This is generally done by utilizing the programming language.

FIG. 2 illustrates how a system according to the invention in an alternative embodiment can be built up on several levels. The local units 1 are linked to a central unit 4 which controls a region ("regional units"), while several such units are in turn linked to a common central unit 7 on a higher administrative level, for example on a country-wide basis. The figure also illustrates how automated transaction devices 2 can be connected to the local unit via a local network 5, in which case it will be possible to implement solutions where a local unit 1 controls a plurality of automated transaction devices 2.

In one embodiment a plurality of automated transaction devices 2 are located within a relatively limited area, or at least in such a manner that they can all be connected to the same high-speed data network 5. In this case savings can be made by storing campaigns centrally in a local unit 1 which covers this entire area and transferring some of the functionality to the automated transaction devices 2, thus enabling them to query the local unit 1 at every exposure. In the following, such transferred functionality will be called interface 8. This makes the equipment which is linked to each automated transaction device 2 cheaper than if each automated transaction device were linked to a separate local unit 1, and the local unit 1 can store more information while at the same time, e.g., running the databases which are required for some of the campaigns. In addition, the number and the length of the communication with the central unit 4 can be reduced. In order to cover this possibility and variations thereof, the local unit 1 may alternatively be generalised, with the result that in addition to controlling its own automated transaction device 2, a local unit can also act as a central unit for other local units. Whether a local unit 1 can control a plurality of automated transaction devices simultaneously, or whether we are talking about a local server ("central" local unit) and several small computers ("light" local units) is a matter of implementation.

In this embodiment the interfaces 8 will "talk to" the local unit 1 via a local network 7 or another high-speed network in order to receive the information message and to enable the local unit 1 to update its database and possibly receive context information. The local unit 1 "negotiates" further with the central unit 4. If we choose to regard the interfaces 8 as local units, they will only have one trigger which is activated regardless of what happens. The campaign to which this trigger is connected will be retrieved from the "central" local unit every time it has to be displayed. The "central" local unit will receive all the information the "light" local unit has available concerning the user as a part of the inquiry. The "central" local unit can thereby make exactly the same choices as a local unit 1 linked to only one automated transaction device 2 otherwise would have made.

One thing which the system makes possible in contrast to other media, is near real time monitoring of exposures. The amount of time which expires from when an exposure takes place until it is recorded in the central database can be adjusted by means of the frequency on which the local units are called up. The system is real time in both directions. A campaign which is in the form of an inquiry in a database may, e.g., display the latest stock exchange prices or the number of vacant seats left for the big football match. The campaign triggers may also be based on real time. For example, campaigns at cash dispensers in the vicinity of a stadium can be activated depending on the result of the big football match, while the spectators are still on the way out.

The central unit 4 will generally be built round a fault-tolerant system (also called high availability, or HA). A fault-tolerant system is designed so as to function even though some parts of the system fail. The largest Unix suppliers (IBM, Sun, HP and Digital) offer fault-tolerant systems. A fault-tolerant system may consist of two computers, both of which run a database. Only one of the databases is actually in use, but when an alteration occurs in one of the databases it informs the other, so that it too is updated. If one of the computers finds that the other is not functioning properly, it takes over the tasks and cuts the power supply to the other computer. (Other strategies are also possible). It will be an advantage if both are not dependent on the same power source and telephone exchange, so both machines need not be located in the same place. The telephone exchanges themselves are fault-tolerant, but there is little that can be done when the telephone does not work and one does not have access to the exchange.

The control of which information message has to be displayed is carried out by the local unit 1 based on information it has received via the central unit 4. The local unit 1 has a single database concerning the information message and campaigns run thereby, but does not run a database server in the usual sense of the word. Some of the reasons for this are as follows:

The local computer 1 is a real time system. A real time system is a system in which results must be presented after a given time. An information message has to be displayed a number of milliseconds after the signal has been given from the automated bank. Few modern databases are suited to this type of use.

Database server licenses are usually expensive.

Database servers required a great deal of resources which make the computer unnecessarily expensive.

Database servers have a great deal of unnecessary functionality.

From the conceptual point of view, however, it is an advantage to regard the local database as a subset of the database of the central unit.

The main function of the system round the database of the local unit 1 is to implement a scheduler. A scheduler is an algorithm which, when given a set of tasks with related priorities, selects the best sequence for the tasks given a set of criteria which say what is a "good" sequence. The scheduler problem comes from operative system theory concerning the most efficient method possible of making an operative system for computers which run a great many programs. In our case the tasks are the various campaigns or information messages which have to be displayed. The priorities are given by what the exposure of the information messages has been achieved relative to exposure guarantees specified by the system. The criteria for what constitutes a "good" sequence is that the scheduler fulfils the exposure guarantees requested by the central server.

Schedule algorithms often have to be tested and simulated before it can be safely said that they are satisfactory. There are, however, many algorithms to choose from, and the scheduler problem has been solved many times before.

FIG. 3 illustrates an example of the construction of the local unit 1 and an automated transaction device 2, here in the form of an automated bank. The local unit 1 consists of a modem 3 for communication with the central unit 4 and a computer 9 with a control system 10. The local unit 1 is linked to an automated bank 2 for display of the information message to the end user. The information message is displayed to the user in pauses during the transaction, or at times when the automated bank 2 is not in use. It is also possible to insert the information in a part of the screen 11 which is not employed for the transaction, e.g. in the form of a banner at the top or bottom of the screen 11.

The automated bank 2 communicates with the control system 10 in order to notify it when an information message can be displayed. The automated bank 2 may also supply context information to the control system 10, thus enabling it to select a context-dependent information message. The communication between the control system 10 and the automated bank 2 may be performed in various ways. The most fundamental requirement for this communication is that the control system can detect pauses in the transaction. We shall look at three possibilities for how this can be done:

Detection of pauses by means of "monitoring" of the screen interface.

Detection of pauses in software without the use of special hardware.

Detection of pause signals in the analog screen signal.

The possibilities offered by the different methods vary, involving various degrees of encroachment on the automated bank. In order to look more closely at what these methods entail, we have to consider how the automated bank is constructed.

FIG. 4 is a simplified picture of an automated bank 2. The automated bank 2 consists of a keyboard 12, a frame memory 14 and a screen 11 in addition to a system 15 which controls these units. For our purpose it is particularly interesting to look at how the screen handling works. The automated bank 2 may be equipped with two types of output units: a frame memory 14 or character-based terminal 17 with limited graphic possibilities. FIG. 5 illustrates an automated bank 2 which has no frame memory, but which operates with a terminal interface 16. These two types of output units are used in different ways from the point of view of the control system 15. In a frame memory 14 each point on the screen 11 is addressable, and can be placed individually. There has to be a great deal of logic for drawing of characters as a part of the control system 15. A terminal interface 16, on the other hand, has much of this built in, with the result that the control system 15 can give more sophisticated commands such as "write XYZ at position (a,b) on the screen". The fact that a terminal interface 16 operates at a higher level of abstraction than a frame memory interface 14 means that the amount of data which has to be transferred in order to have a given task performed is substantially lower.

For a unit which is located between the control system 15 and the screen interface 14;16, an advanced interface of this kind will make it easier to detect that the control system 15 is performing an operation such as "write WAIT A MOMENT on the screen" than in the simple graphic system. A unit which works in this way will be located at point A in FIG. 3.

In the graphic interface the command "write WAIT A MOMENT on the screen" will be more sophisticated. Firstly, the command is translated into a set of commands concerning points which have to be drawn on the screen. These commands are then transmitted to the frame memory 14. The commands are not available to the unit which is "monitoring" the conversation until they are transmitted to the frame memory 14. In addition, the points can be placed in the frame memory 14 in many sequences, with the result that detection will be based on "recording" a conversation between the control system 15 and the frame memory 14 immediately before a pause and storing it as a pattern for which one searches continuously. The interface with a frame memory 14 is generally via the system bus, which requires that the unit which is to be hooked on must be connected thereto. In an integrated system this may be problematic if there is no room for an extra point on this bus. The unit also has to operate at a relatively high speed and if the unit is to contain many patterns, it may require more storage capacity then the alternatives.

For an automated bank 2 with terminal interface 16 some things become rather easier. The communication between the control system 15 and the terminal interface 16 is usually carried out via a serial line, and they often pass through wires on to which it is possible to connect a unit. The serial line usually operates at low speed, thus avoiding signalling problems, which commonly arise for buses. Low speed means that the communication channel to the external control system 10 in the local unit 1 can be low, while still transferring all the information which passes between the control system 15 and the terminal interface 16. The result of this is that the unit requires a minimum of logic and the low speed makes it economically justifiable to use optical fibres between the external control system and the automated bank.

The disadvantage of the terminal interface 16 is that one does not have complete freedom to form the image as one oneself wishes. Some advertising effects such as video clips and the like are too demanding of resources for the terminal interface 16. The graphic possibilities of the terminal interface 16 also have to be employed and in practice these will be limited to what can be seen in automated banks at present.

A variant of the above method is based on a less severe physical encroachment on the automated bank 2, but requires encroachment in the software in the control system. The method is illustrated as points B and C in FIG. 3. In this method the data system's control system 15 has to run on a vacant input/output unit, or such a unit has to be introduced. It may be a vacant serial port or parallel port or the like. By means of simple software alterations the control system 15 can transmit a signal to this output unit in order to signal that it is in a pause. While it is waiting to continue it can read from this input/output unit and write to the screen interface. This method is very inexpensive to implement.

Independently of the screen interface which is used, an automated bank will usually be equipped with a CRT screen. A terminal interface 16 or a frame memory 14 will finally translate its internal digital representation of how the screen 11 looks to an analog signal. This analog signal drives the electron beam in the CRT screen which draws the screen image. This signal comes in two normal variants—composite and separated. In a composite signal red, green, blue, vertical synchronisation signal and horizontal synchronisation signal are transmitted in the same signal, while otherwise they are transmitted separately.

This method is the most advanced and is based on detection of the pause signal by translating the analog signal to a digital signal and building a single computer specially designed for recognition of patterns in such a signal. The unit referred to has to be installed at point D in FIG. 3.

Reference E in the figure illustrates the transfer of screen signals and information from the unit to the external control system 10.

When the unit at point D detects a pause signal it will switch to an analog screen signal which is generated from the external control system 10. The external control system 10 is free to generate the most sophisticated information messages containing live video and other advanced graphics.

Direct transfer of the screen signal can lead to synchronisation problems. The CRT screen 11 may be confused by receiving a vertical synchronisation signal at the wrong time and may give a short "flash" when the information message starts if the screen signal from the automated bank 2 and the control system are not synchronised. To avoid this, we make the vertical synchronisation signal a "pattern" the unit is always searching for and transmits to the external control system. Software or hardware in the external control system 10 have to ensure that the screen card is synchronised with this signal.

Transfer of the information message in E in FIG. 3 must be performed analogously since the bandwidth which is required is too high to enable it to be converted from analog to digital in an inexpensive manner. This excludes optical fibres as the transfer method. The transfer channel from the automated bank 2 to the control system 10, on the other hand, has a relatively low bandwidth, and it is digital, thus enabling optical fibres to be used. It is also this channel which will be capable of containing-sensitive information.

Assuming a resolution of 640×480 points, 20% overscan and 60 Hz refresh rate, we will require approximately $$640*1.2*480*1.2*60=26.5\text{ MHz} \quad (1)$$

bandwidth from the computer to the automated bank. (Overscan is the area which lies outside the visible screen image 20, and often extends outside the actual screen. Overscan which lies on the right or left of the visible screen image 20 is called horizontal overscan 21, while overscan above or below the visible screen image 20 is referred to as vertical overscan 22. See FIG. 6). The bandwidth for the signal from the automated bank to the computer is generally restricted to how much information that has to be transferred in this direction. A lowest limit, however, is set by the fact that the vertical synchronisation signal must be capable of being transferred fast enough to be able to be used for synchronising the screen signal of the computer.

FIG. 7 is a schematic description of a unit which can do this. The analog signals from the automated bank 31 and the external computer 32 respectively are coupled together in a unit called a "selector" 33 which is controlled by the processor 34. The analog signal from the automated bank 31 passes through an A/D converter 35 which transmits the signal on to the processor 34. The processor searches for "patterns" in the data from the AID converter 35. When the processor finds a pattern it will perform a command which is either to transmit a control signal 36 to the selector 33 or to transmit data to the external computer 37.

The processor's 34 function is to find "patterns" in the screen signal. A pattern is a two-dimensional set of points where each point is tested for whether the intensity lies within a minimum and maximum limit. Since the signal is analog and the size of the overscan area may be different from installation to installation, it will be desirable to have a little tolerance as to where the pattern is located on the screen. The processor 34 which is described here makes it possible to have a degree of tolerance in the vertical direction, but not in the horizontal.

A pattern consists of one or more rule instructions each of which consists of one or more subrule instructions. Each rule instruction with related subrule instructions finds a screen line of the pattern.

Each rule instruction is performed in turn, and for each rule instruction which is performed, all the subrule instructions are performed. If the processor 34 is not finished with all the subrules related to a rule before the next hsync signal, it starts over again to perform the list of subrules. Similarly, the processor 34 will start at the beginning of the list of rules at each vsync signal.

A rule instruction has an number of line numbers for which it is valid which is used to implement tolerance in the vertical direction. This is not perfect, since a rule which hits on the first line will result in subsequent rules having more tolerance than if it hits on the last line.

As the processor 34 is designed, it will not be capable of recognising patterns based on whether it has previously recognized a pattern or searched for several patterns simultaneously. None of these limitations is considered to be a major weakness since the processor 34 will perform approximately 60 pattern recognitions per second (the refresh rate of the screen). It will therefore be able to traverse a list of patterns where it recognises a new pattern in the list with every screen update (with every vsync signal it receives).

FIG. 8 is a flow diagram of how the processor works. This processor is somewhat simplified compared to that described above. It only supports one pattern and the tolerance handling can be improved.

Rule and subrule instructions come after one another in the memory. First there is a list of rules and then lists of subrules. Each rule contains the address of the list of subrules which have to be performed as a part of the rule.

FIG. 9 illustrates how the rules are located in the memory. Each rule occupies 4 octets of storage space (32 bits).

The rule instruction

The rule instruction consists of four fields (FIG. 9*a*). First of all it contains a 15 bit long address (FIG. 9*b*) for the first subrule in the list of subrules which are to be performed. It then contains a bit called "last" (FIG. 9*c*) which is set if this is the last rule in the pattern. Then two fields called "min" (FIG. 9*d*) and "max" (FIG. 9*e*) follow which indicate the minimum and maximum line numbers for which this rule applies.

The Subrule Instruction

The subrule instruction resembles the rule instruction but instead of a "subrule address" field it has a field called "wait" (FIG. 9*f*) which tells how many columns the processor should wait before it retrieves data from the A/D converter and checks whether the data are located between "min" and "max". "Min" and "max" thus have completely different meanings in the two instructions.

In addition to recognising patterns it is desirable that the automated bank 2 can transfer information to the external computer 1;9 by drawing or writing on the screen 11. This can be done by having a type of subrule which waits "wait" number of columns, retrieves data from the A/D converter 35 and transmits it via the serial line. In order to synchronise horizontally a subrule may also be introduced which waits for data from the A/D converter 35 which is greater or less than a given value.

What is claimed is:

1. A system for displaying a message on automated transaction devices with a screen, where in periods of time or areas of the screen which are not used in connection with any ongoing transaction. the screen is employed for displaying a message, comprising:

one or more central units and one or more local units, and wherein each local unit includes means for controlling display of information messages on one or more automated transaction devices and is permanently or connectably coupled to at least one central unit, wherein at least one central unit comprises an information database which contains the information messages that are to be displayed, said information messages being independent of the ongoing transaction, at least one central unit contains specified conditions for when and how each information message in the information database should be displayed, at last one central unit comprises means for transferring said information messages, the local units comprise means for retrieving context information comprising means for determining the identity of a user of the automated transaction device, or at least for retrieving pre-defined information about said user, and optionally means for retrieving other data concerning the surroundings, together with means for recording and storing statistical data concerning the use of the automated transaction devices and the presentations of the messages, the local units comprise means for transferring such data to one or more central units, and means for selecting which of the available information messages should be displayed at any time by comparing said retrieved data with said specification for each individual information message.

2. A system according to claim 1, wherein said information on said user includes at least sex and/or age.

3. A system according to claim 1 or 2, wherein said information on the surroundings includes at least one of the following: the geographical location of the automated transaction device, time of day, day of the week, week number and for what kind of service the automated transaction device is being used.

4. A system according to claim 1, wherein said specified conditions for when and where an information message should be displayed comprises at least some of the types of data which may be determined by the local units, possibly together with how many times a given information message should be displayed.

5. A system according to claim 1, wherein a plurality of central units, each of which controls local units in its own region, are linked together via a common central unit, thus forming an additional hierarchical level for administration of the system.

6. A system according to claim 1, wherein the local unit comprise a computer which, every time an information message has to be displayed, selects from the messages it has received from the central unit on the basis of conditions received from the central unit and available information on the extent to which these conditions have been fulfilled.

7. A system according to claim 1, wherein a local unit is connected to a plurality of automated transaction devices in a geographically relatively limited area, such as, for example, a shopping centre, and supplies information messages to the automated transaction devices connected thereto when they signal that they are ready to receive and display such messages.

8. A system according to claim 1, wherein a given automated transaction device comprises equipment for detecting pauses in its own screen signal and for signaling to the connected local unit that it is in a pause, thus enabling the information system to take over control of the screen and display a message for the duration of the pause.

9. A system according to claim 7, wherein one or more of the automated transaction devices which are linked to the same local unit comprise equipment for detecting pauses in their own screen signal, and further comprise an interface for communicating with the connected local unit via a data network, this communication comprising signals to the local unit informing it that the automated transaction device is ready to receive and display an information message, possible context information from the automated transaction device to the local unit, and an information message from the local unit to the automated transaction device.

10. A system according to claim 8 or 9, wherein the detection of pauses is carried out by means of a unit which monitors the automated transaction device's screen interface.

11. A system according to claim 8 or 9, wherein the detection of pauses is carried out by programming the automated transaction device's control system to signal when the automated transaction device is in a pause.

12. A system according to claim 8 or 9, wherein the detection of pauses is carried out by means of a unit which monitors the analog screen signal in the automated transaction device in order to detect a pattern therein which indicates that the automated transaction device is in a pause.

13. A system according to claim 1, wherein the local units are linked to more than one central unit, said more than one central unit either being identical in order to increase the system's reliability, or different in order to give the local units access to different databases.

14. A system according to claim 1 wherein the central unit may comprise means for selecting on the basis of the statistical data received from the local unit which information messages should be transferred to the local units and/or for altering the specified conditions for when and where the individual information message in the information database should be displayed.

* * * * *